350-1.7
9/23/80 OR 4,223,974
SR

United States Patent [19] [11] 4,223,974
Masso [45] Sep. 23, 1980

[54] ENHANCED BONDING OF SILICON OXIDES AND SILVER BY INTERMEDIATE COATING OF METAL

[75] Inventor: Jon D. Masso, Whitinsville, Mass.

[73] Assignee: American Optical Corporation, Southbridge, Mass.

[21] Appl. No.: 930,458

[22] Filed: Aug. 2, 1978

[51] Int. Cl.[3] .......................... G02B 5/28; G02B 1/10; G02B 3/00

[52] U.S. Cl. .................................... 350/1.7; 350/166; 427/160

[58] Field of Search ........................ 350/1.7, 164, 166; 427/160, 162, 163, 164, 167

[56] References Cited

U.S. PATENT DOCUMENTS

| | | | |
|---|---|---|---|
| 3,682,528 | 8/1972 | Apfel et al. | 350/1 |
| 3,846,152 | 11/1974 | Franz | 350/1 X |
| 3,990,784 | 11/1976 | Gelber | 350/166 |
| 4,127,697 | 11/1978 | Laurin | 428/913 X |
| 4,179,181 | 12/1979 | Chang | 427/160 X |

*Primary Examiner*—James R. Hoffman
*Attorney, Agent, or Firm*—Jeremiah J. Duggan; Alan H. Spencer

[57] ABSTRACT

Interference filters having a vapor deposited layer of a silicon oxide adjacent to a vapor deposited layer of silver have adhesion between these layers improved by a very thin intermediate coating of chromium, nickel or an alloy containing about 90% chromium and nickel. Plastic articles having infrared reflecting interference filters with improved adhesion between layers, such as lenses and welding faceplates, are also disclosed.

8 Claims, No Drawings

ENHANCED BONDING OF SILICON OXIDES AND SILVER BY INTERMEDIATE COATING OF METAL

BACKGROUND OF THE INVENTION

This invention relates to interference filters having adjacent silicon oxide-silver layers and, more particularly, to such filters having bonding between the layers enhanced by a very thin metal film.

Infrared reflecting filters having adjacent refractory dielectric-silver coatings have recently been discovered. Such filters are described in detail in the copending application of Leei Chang entitled, "Infrared Reflecting Articles," Ser. No. 892,585 filed Apr. 3, 1978, and now U.S. Pat. No. 4,179,181. The articles are made by vapor depositing one or more three-coating periods. Each period has a layer of silver sandwiched between two layers of a refractory oxide. Suitable refractory dielectrics disclosed include silicon oxides having the formula $SiO_x$, where x is from 1 to 2. The application further discloses that palladium enhances the bond between the $SiO_x$ and silver layers. However, palladium has the disadvantage of substantially reducing the visible transmission, even when used in films as thin as 5 Å, as well as being very expensive.

SUMMARY OF THE INVENTION

A very thin coating of certain metals substantially improves the adhesion between adjacent, vapor deposited layers of silver and $SiO_x$, where x is from 1 to 2. Suitable metals include nickel, chromium and alloys having a nickel/chromium content of about 90%, suc as Inconel. Since the coating is very thin, 3 to 20 Å, vapor deposition is a preferred method of applying the coating. While the coating thickness is not particularly critical, a coating sufficient to provide enhanced adhesion without significantly reducing light transmission is preferred. Usually a thickness of 3 to 8 Å is sufficient.

Although, it is the metal most sensitive to coating rate and conditions, chromium is a preferred metal for the adhesion-promoting coating, if an abrasion-resistant coating is to be applied to a finished article having a polycarbonate substrate. Application Ser. No. 762,088 filed Jan. 24, 1977, by Laurin, and now U.S. Pat. No. 4,127,697 discloses the preferred method and materials for providing abrasion-resistant coatings. These coatings, as well as, the prime coat are applied as taught in the patent. A specific example will be given hereinafter. When the abrasion-resistant coating is used, chromium unexpectedly provides enhanced adhesion between the silver and $SiO_x$ layers in the final product even if adhesion was not significantly enhanced before the abrasion-resistant coating was applied. While the mechanism by which this occurs is not fully understood, the advantage of increased yields is substantial.

THE PREFERRED EMBODIMENTS

EXAMPLE 1

Using conventional vapor deposition apparatus and procedures, four plano, polycarbonate lenses were coated on one side at room temperature with an interference filter having adjacent SiO/Ag layers. Initial pump down for coating was to $1\times10^{-5}$ Torr with the individual layer thicknesses and $O_2$ partial pressures indicated below.

| Layer No. | Layer Material | $O_2$ | Layer Thickness |
|---|---|---|---|
| 1 | SiO | $3\times10^{-5}$ | 550Å |
| 2 | Ni | -------- | 6Å |
| 3 | Ag | -------- | 100Å |
| 4 | SiO | $2\times10^{-5}$ | 550Å |
| 5 | SiO | $2\times10^{-5}$ | 550Å |
| 6 | Ni | -------- | 6Å |
| 7 | Ag | -------- | 100Å |
| 8 | SiO | $2\times10^{-5}$ | 550Å |

EXAMPLE 2

Two other runs having two lenses coated in each were conducted following the same procedure but having an initial pump down of $9\times10^{-6}$ and $8\times10^{-6}$, respectively. The silver layers were deposited more slowly in the run having the higher pressure and these slower deposited coatings failed a pressure-sensitive tape test for adherence. All other lenses of Examples 1 and 2 passed the adhesion tape test.

The adherence tape test was conducted as follows:

A piece of ½" pressure-sensitive celluloid tape (Scotch Brand manufactured by 3M Company) is firmly pressed on the surface for a distance of about 1". While holding the lens in one hand, the free end of the tape was jerked in a direction perpendicular to the lens surface. No separation of coating(s) is required for a "passed" adherence report. Although, separation between layers or between the first layer and the substrate usually begins at the edge (where the coating(s) stop), separation occurring at any location results in a "failed" report.

Since lenses with abrasion-resistant coatings have the final coating covering the entire lens without interruption, the lens surface with the filter coatings is cross-hatched with cuts extending to the substrate and approximately 3 to 5 mm. apart before applying the tape. One end of the pressure-sensitive tape is then pressed on the cross-hatched coating(s) and the other end is then jerked in a direction perpendicular to the surface. The multiple edges offer a greater opportunity for adherence failure and this test is considerably more severe than the normal adherence test.

The speed with which vapor deposition occurs is a function of the gun power, type of crucible, gun focus, and the distance from the material source to the workpiece. In a chamber having a source to workpiece distance of 48 cm., a deposition rate of about 1 Å/Sec. is required for "fast" depositions of nickel, chromium and Inconel and about 10 to 15 Å/Sec. for silver. The rate of silver deposition was about 2 Å/Sec. for the "slow" run of Example 2. While the deposition rate is not critical to the adherence of the $SiO_x$ layer, such deposits are usually made at a rate of 15 Å/Sec.

EXAMPLE 3

Following the procedure of Example 1, two polycarbonate lenses were coated with the interference filter. One lens was coated without the adhesion-promoting coatings and the other with 6 Å of chromium as the adhesion-promoting coating material. The lens without the chromium failed the tape adherence test while the lens with the chromium coatings passed the test. When using chromium, care must be exercised to allow the chromium source to cool nearly to room temperature before opening the chamber in order to prevent the formation of oxides on the source. Such oxides act as contaminate in subsequent coating operations. Chromium can be evaporated by resistance heating methods but an electron beam gun is the preferred method.

EXAMPLE 4

Using the procedure of Example 1, two runs were made coating two polycarbonate lenses in each run with Inconel as the adhesion-promoting coating instead of nickel. The first run had coatings of 6 Å of Inconel deposited in about 5 seconds each and the second run had coatings of the same thickness deposited in about 30 seconds each. Both lenses of the first run passed the tape adherence test while both lenses of the second run failed the test.

EXAMPLE 5

A number of polycarbonate lenses were coated using the procedure of Example 1, except chromium was used instead of nickel. After applying the interference filter, the lenses were divided into two groups when it was discovered that adhesion between the chromium and silver was poor. In fact, all lenses of one group failed the tape adherence test. The poor adhesion was probably due to either not cooling the chromium source before opening the chamber after a prior run or depositing the chromium at too slow a rate. The other group of polycarbonate lenses having the interference filter coatings were treated by immersion at room temperature in a tie-coat solution containing 10% gamma-amino propyl triethoxysilane, 85% ethyl alcohol and 5% water for one minute. The primed lenses were then removed from the silane solution, rinsed in water and dried.

The primed lenses were then coated with an abrasion-resistant coating obtained from Dow-Corning and identified as Q9-6312. Dow-Corning personnel advises the material was covered by U.S. Pat. No. 3,986,997. The Q9-6312 was filtered upon receipt, placed in a container and the lenses were immersed and then withdrawn at a controlled rate of 7½ inches per minute. The lenses were then cured in an air-circulating oven for eight hours at 250° F. All of the lenses in the group having the abrasion-resistant coating passed the more severe cross-hatched tape adherence test in spite of the adherence problem existing before applying the abrasion-resistant coating.

Although chromium has been previously used as a binder to glass in the manufacture of mirrors, its use in interference filters and, particularly, in a manner providing "fail-safe" adherence properties was unexpectedly discovered by the inventor.

What is claimed is:

1. In an interference filter having a silver layer and a $SiO_x$ layer, where x has a value of 1 to 2 and the layers have been vapor deposited, the improvement comprising a, vapor-deposited, adhesion promoting metal layer selected from the group consisting of Ni, Cr and Inconel, intermediate said silver layer and said $SiO_x$ layer.

2. The improvement of claim 1 wherein the adhesion-promoting metal layer has a thickness of about 3 to 20 Å.

3. The improvement of claim 2 wherein the adhesion-promoting layer is Cr and the thickness is about 4 to 6 Å.

4. The improvement of claim 1 wherein the adhesion-promoting layer is Cr.

5. An infrared reflecting welding faceplate comprising:

(A) a polycarbonate plastic substrate;

(B) an interference filter bonded to a side of A having sequentially (1) a layer of $SiO_x$, where $1>x>2$, (2) an adhesion-promoting layer of Cr, Ni or Inconel, (3) a layer of Ag, (4) an adhesion-promoting layer of Cr, Ni or Inconel, (5) a layer of $SiO_x$, where $1>x>2$, and;

(c) a continuous abrasion-resistant coating enclosing the faceplate.

6. The infrared-reflecting welding faceplate of claim 5 wherein (B)(2) and (B)(4) are Cr and about 4 to 6 Å thick.

7. An infrared-reflecting lens comprising:

(A) a polycarbonate lens substrate;

(B) an interference filter bonded to a side of A having sequentially (1) a layer of $SiO_x$, where $1>x>2$, (2) an adhesion-promoting layer of Cr, Ni or Inconel, (3) a layer of Ag, (4) an adhesion-promoting layer of Cr, Ni or Inconel, (5) a layer of $SiO_x$, where $1>x>2$, and;

(c) a continuous abrasion-resistant coating on the lens.

8. The lens of claim 7 wherein (B)(2) and (B)(4) are Cr and about 4 to 6 Å thick.

* * * * *